United States Patent Office 2,757,191
Patented July 31, 1956

2,757,191

POLYURETHANE BIS-CHLOROFORMATES

Frederic B. Stilmar, Wilmington, Del., assignor to E. I. du Pont de Nemours and Company, Wilmington, Del., a corporation of Delaware No Drawing. Application August 4, 1955,
Serial No. 526,568

3 Claims. (Cl. 260—463)

This invention relates to novel bis-chloroformates and more particularly to polyurethane bis-chloroformates.

This invention has as an object to provide polyurethane bis-chloroformates. A further object is to provide polyurethane bis-choloroformates derived from the reaction of a polyalkyleneether glycol with an organic diisocyanate followed by the reaction with phosgene. A still further object is to provide a process for the preparation of these novel polyurethane bis-chloroformates. Other objects will appear hereinafter.

These and other objects of the following invention are accomplished by providing novel polyurethane bis-chloroformates having the general formula:

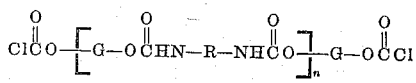

wherein O—G—O is a bivalent organic radical obtained by removing the terminal hydrogen atoms from a polyalkyleneether glycol having a molecular weight of at least 750; R is a bivalent organic radical, said radical being inert to isocyanate groups; and $n$ is an integer from about 1 to 19.

The novel polyurethane bis-chloroformates of the present invention are prepared by reacting together a molar excess of a polyalkyleneether glycol having a molecular weight of at least 750 and an organic diisocyanate so as to provide a polyurethane having terminal hydroxyl groups. This polyurethane is then reacted with a molar excess of phosgene so as to provide a polyurethane bis-chloroformate.

The polyalkyleneether glycols which are useful in preparing the novel polyurethane bis-chloroformates of the present invention may be represented by the formula HO(RO)$_n$H, wherein R is an alkylene radical which may be the same or different, and $n$ is an integer sufficiently large so that the glycol has a molecular weight of at least 750. These glycols may conveniently be prepared by the polymerization of cyclic ethers such as alkylene oxides, tetrahydrofuran, etc. For purposes of the present invention, other glycols, such as polyalkyleneether-thioether glycols, polyalkylene-aryleneether glycols and polyaliphatic hydrocarbon glycols, may be used. In general, the polyalkyleneether glycols, and more specifically the polytetramethyleneether glycols, are preferred. The molecular weights of these glycols should be at least about 750 and may be as high as 10,000; however, for purposes of the present invention, molecular weights of between 750 and 5,000 are generally preferred.

Any of a wide variety of organic diisocyanates may be used in preparing the polyurethane glycols which are subsequently reacted with phosgene to form polyurethane bis-chloroformates. These diisocyanates may be of the aromatic, aliphatic or cycloaliphatic type. Representative compounds include toluene-2-,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanate, i. e., those in which each of the two isocyanate groups is attached directly to an aromatic ring, are preferred. In general, they react more rapidly with the polyalkyleneether glycols than do the alkylene diisocyanates. Compounds such as toluene-2,4-diisocyanate in which the two isocyaante groups differ in reactivity are particularly desirable.

The reaction between the organic diisocyanate and a molar excess of a polyalkyleneether glycol to prepare a polyurethane glycol may be carried out in suitable mixing equipment at a temperature which is preferably from about 20° C. to about 150° C. Since the reaction takes place rather slowly at room temperature, it is generally preferable to heat the two compounds together at a temperature of at least about 50° C. It is rather convenient to use a temperature of about 100° C. since at this temperature the reaction takes place completely in a relatively short time to yield a polyurethane glycol having no free isocyanate groups. For purposes of the present invention, molar ratios of polyalkyleneether glycol to organic diisocyanate of between about 2:1 and 20:19 should be used and molar ratios of about 2:1 to 8:7 are generally preferred.

The polyurethane glycol is reacted with a molar excess of phosgene to form a polyurethane bis-chloroformate. This reaction may be carried out in an inert solvent, such as benzene, o-dichlorobenzene, etc. After the reaction has been completed, a low boiling solvent may be removed by warming under vacuum. A maximum temperature of about 30 to 35° C. should not be exceeded, in removing the solvent, to avoid decomposition of the bis-chloroformate. Dry nitrogen may be fed into the mass during the warming to assist in removal of the solvent. For purposes of the present invention, it is desirable to use an excess of the phosgene and it is preferred to use at least a 100% molar excess. The phosgene reacts with the hydroxyl groups of the polyurethane glycol to form the polyurethane bis-chloroformates. It is quite unexpected that the excess of phosgene does not react with the active hydrogen atoms on the urethane nitrogens of the polyurethane glycol.

The following examples will better illustrate the nature of the present invention; however, the invention is not intended to be limited to these examples. Parts are by weight unless otherwise indicated.

Example 1

955 parts of polytetramethyleneether glycol, having a molecular weight of 955, and 140 parts of toluene-2,4-diisocyanate are heated together under nitrogen at 90 to 100° C. for 1 hours, at 100 to 120° C. for 1 hour and finally at 120 to 130° C. for 1 hour to form a polyurethane glycol. After cooling, 540 parts of the polyurethane glycol is dissolved in 616 parts of dry benzene which is then added gradually while stirring over a period of about 2 hours to 540 parts of liquid phosgene, the temperature being maintained at 0 to 10° C. by cooling After the addition is complete, the mass is allowed to warm up to room temperature. After about 2 hours, a stream of nitrogen is blown through the solution while it is agitated vigorously and the temperature is maintained at 30 to 35° C. to remove excess phosgene. From time to time dry benzene is added to replace that carried off with the nitrogen. After 24 hours, the exit gas is free of phosgene. 1117 parts of benzene solution of the polyurethane bis-chloroformate is recovered.

Example 2

550 parts of a polytetramethyleneether glycol having a molecular weight of 914 and 70 parts of toluene-2,4-diisocyanate are stirred together at 80 to 90° C. for 3 hours to form a polyurethane glycol of molecular weight 3100. 300 parts of this polyurethane glycol is dissolved in 250 parts of benzene and added gradually to 300 parts of phosgene at 0 to 5° C. over a period of 30 minutes. The mass is then stirred and allowed to come to room temperature while phopsgene boils off. It is then blown with dry nitrogen until no phosgene is detectable in the vent gas. Analysis shows 1.06% hydrolyzable chlorine (theory 1.05%).

Example 3

1510 parts of a polytetramethyleneether glycol having a molecular weight of 955 and 159 parts of p-phenylene diisocyante are agitated and heated together under nitrogen for 3 hours at 80 to 100° C. to form a polyurethane glycol. After cooling, 500 parts of this polyurethane glycol is dissolved in 880 parts of benzene and this solution is added gradually to 500 parts of phosgene at 0 to 5° C. over a period of 2 to 3 hours while agitating. The mass is allowed to come to room temperature and a stream of nitrogen is blown through the mass while it is agitated and the temperature is maintained at about 30 to 35° C. This stream of nitrogen is maintained until no phosgene is detectable in the exit gas. From time to time dry benzene is added during the blowing of nitrogen in order to keep the mass easily stirrable. 1177 parts of the benzene solution of the polyurethane bis-chloroformate is recovered. The solution is then warmed to 30° C. under vacuum while a slow stream of nitrogen is fed through the mass until the benzene is evaporated to yield the biscous, liquid bis-chloroformate.

Example 4

980 parts of a polytetramethyleneether glycol having a molecular weight of 980 and 219 parts of 3,3'-dimethyl-4,4'-biphenyl diisocyanate are stirred and heated together for 1 hour at a temperature of 100 to 110° C. and finally for 2 hours at a temperature of 120 to 130° C. to form a polyurethane glycol. After cooling, 220 parts of this polyurethane glycol having a calculated molecular weight of about 5960 is dissolved in 250 parts of benzene and this solution is then added gradually to 500 parts of phosgene at 0 to 5° C. over a period of about 1 to 2 hours while agitating. The mass is then allowed to stand overnight at room temperature and a stream of nitrogen is then blown through the solution until the exit gas is free of phosgene. From time to time dry benzene is added to replace that carried off with the nitrogen. After the phosgene has been removed, vacuum is applied while a slow stream of nitrogen is continued and the mass is warmed to 30° C. to remove the benzene. Essentially a quantitative yield of the viscous bis-chloroformate is obtained.

Example 5

980 parts of a polytetramethyleneether glycol, having a molecular weight of 980 and containing 0.02% water, and 131 parts of p-phenylene diisocyanate are stirred and heated together for 1 hour at 100 to 115° C. and finally for 2 hours at 120 to 130° C. 400 parts of the resulting polyurethane glycol, having a calculated molecular weight of about 5540, dissolved in 750 parts of dry benzene and the resulting solution is then added slowly to 400 parts of phosgene while agitating, the temperature being maintained at 0 to 12° C. The resulting mass is then allowed to stand overnight at room temperature and a stream of nitrogen is then blown through the solution while it is agitated vigorously to remove excess phosgene. From time to time dry benzene is added to replace that carried off with the nitrogen. When the phosgene has been removed, the benzene is then removed to yield a soft, tack bis-chloroformate.

Example 6

930 parts of a polytetramethyleneether glycol, having a molecular weight of 930, and 157 parts of toluene-2,4-diisocyanate are stirred and heated together for 1 hour at 100° C., for 1 hour at 125 to 130° C., and finally for 1 hour at 135 to 150° C. to form a polyurethane glycol. 504 parts of the polyurethane glycol is dissolved in 968 parts of benzene and the resulting solution is then added to 500 parts of phosgene at 0 to 10° C. over a period of 2 hours while agitating. The mass is then allowed to stand overnight and is then blown with a stream of nitrogen at 30 to 35° C. to remove excess phosgene. From time to time dry benzene is added to replace that carried off with the nitrogen and to maintain stirability. 1465 parts of the benzene solution of polyurethane bis-chloroformate is recovered. On evaporating the benzene under vacuum, assisted by a slow stream of nitrogen, a soft, solid bis-choloroformate is obtained.

The bis-choloroformates of this invention range from pourable liquids to soft, tacky solids. The higher molecular weight products are taffy-like in consistency. They should be stored under anhydrous conditions to prevent slow reaction with moisture.

The polymeric polyurethanes of the present invention may be used to prepare novel, thermally stable polyurethane elastomers. Their use in this connection and the resulting thermally stable polyurethane elastomers are more particularly described in copending application Serial No 526,565, filed of even date herewith in the names of Benning et al. The use of these polyurethane bis-chloroformates in the preparation of polyurethane elastomers provides a convenient method of introducing aromatic units into an elastomer in a regular way and also provides a method for placing of cross linking sites in these elastomers in an orderly fashion. These polyurethane bis-chloroformates may also be used to react with amines such as melamine in the preparation of resinous materials.

As many widely different embodiments of this invention may be made without departing from the spirit and scope thereof, it is to be understood that this invention is not limited to the specific embodiments thereof except as defined in the appended claims.

What is claimed is:

1. Polyurethane bis-chloroformates having the general formula:

$$\text{ClCO}-\left[\text{G}-\text{OCNH}-\text{R}-\text{NHCO}\right]_n-\text{G}-\text{OCCl}$$

wherein O—G—O is a bivalent organic radical obtained by removing the terminal hydrogen atoms from a glycol having a molecular weight of at least 750 but not greater than 10,000, said glycol being selected from the group consistting of polyalkyleneether glycols, polyalkyleneether-thioether glycols, polyalkylene-aryleneether glycols and polyaliphatic hydrocarbon glycols; R is a bivalent organic radical, said radical being inert to isocyanate groups; and $n$ is an integer from 1 to 19.

2. Polyurethane bis-chloroformates of claim 1 wherein the bivalent organic radical, O—G—O, is obtained by removing the terminal hydrogen atoms from a polytetramethyleneether glycol having a molecular weight of from 750 to 10,000.

3. Polyurethane bis-chloroformates of claim 2 wherein the bivalent organic radical, R, is a 2,4-tolylene radical.

References Cited in the file of this patent

UNITED STATES PATENTS

| 2,370,568 | Muskat et al. | Feb. 27, 1945 |
| 2,692,874 | Langerak | Oct. 26, 1954 |
| 2,726,219 | Hill | Dec. 6, 1955 |

FOREIGN PATENTS

| 615,884 | Great Britain | Jan. 13, 1949 |
| 701,238 | Great Britain | Dec. 23, 1953 |